(12) United States Patent
Hurley

(10) Patent No.: US 7,334,606 B1
(45) Date of Patent: Feb. 26, 2008

(54) VALVE TESTER SUSPENSION ENHANCEMENTS

(76) Inventor: Lyndon J. Hurley, P.O. Box 70, Harrisburg, SD (US) 57032

( * ) Notice: Subject to any disclaimer, the term of this patent is extended or adjusted under 35 U.S.C. 154(b) by 430 days.

(21) Appl. No.: 10/899,501

(22) Filed: Oct. 5, 2004

Related U.S. Application Data

(63) Continuation-in-part of application No. 10/351,636, filed on Jan. 24, 2003.

(51) Int. Cl.
*F16K 37/00* (2006.01)
*F16K 31/02* (2006.01)

(52) U.S. Cl. ............... 137/899; 251/292; 251/293; 248/647

(58) Field of Classification Search ......... 137/899, 137/1; 251/291–292; 248/281.11, 278.1, 248/282.1, 647
See application file for complete search history.

(56) References Cited

U.S. PATENT DOCUMENTS

| | | | |
|---|---|---|---|
| 1,979,340 A * | 11/1934 | Norman | 73/862.193 |
| 2,548,146 A | 4/1951 | Ferris | |
| 2,548,147 A | 4/1951 | Ferris | |
| 2,746,720 A | 5/1956 | Cannon | |
| 3,417,953 A | 12/1968 | Hillquist | |
| 3,565,372 A | 2/1971 | Jones | |
| 3,572,380 A * | 3/1971 | Jackson | 137/565.01 |
| 4,063,359 A | 12/1977 | Luscombe | |
| 4,183,489 A | 1/1980 | Copher | |
| 4,463,858 A | 8/1984 | Bilas | |
| 4,478,041 A | 10/1984 | Pollman | |
| 4,481,770 A | 11/1984 | Lohbauer et al. | |
| 4,523,286 A | 6/1985 | Koga et al. | |
| 4,561,459 A | 12/1985 | Jackman | |
| 4,600,364 A | 7/1986 | Nakatani et al. | |
| 4,869,002 A | 9/1989 | Glenn | |
| 4,883,249 A | 11/1989 | Garland | |
| 4,961,471 A * | 10/1990 | Ovens | 175/170 |
| 4,987,690 A | 1/1991 | Aaldenbert | |

(Continued)

FOREIGN PATENT DOCUMENTS

EP 0 089 412 A2 9/1983

OTHER PUBLICATIONS

E.H. Wachs Companies, "Truck Mounted Valve Operator Model TM-7", Product Manual, Jan. 2004, pp. 1-55.

(Continued)

*Primary Examiner*—John Rivell
*Assistant Examiner*—Cloud Lee
(74) *Attorney, Agent, or Firm*—Jeffrey A. Proehl; Woods Fuller Shultz & Smith P.C.

(57) ABSTRACT

A valve tester assembly is disclosed that includes an articulated arm assembly having a first end and a second end, with the second end of the articulated arm assembly being movable away from and toward the first end such that when the first end of the articulated arm assembly is connected to a vehicle, the second end of the articulated arm assembly is movable away from and toward the vehicle. The assembly includes a rotation mechanism that is mounted on the articulated arm assembly toward the second end of the articulated arm for rotating a shaft for exercising a valve. The assembly further includes a moving mechanism that is mountable on a vehicle for moving the first end of the articulated arm assembly away from and towards the vehicle.

15 Claims, 15 Drawing Sheets

U.S. PATENT DOCUMENTS

| | | |
|---|---|---|
| 5,299,770 A | 4/1994 | Sayles |
| 5,330,014 A | 7/1994 | Wagner |
| 5,381,996 A | 1/1995 | Arnemann et al. |
| 5,503,423 A * | 4/1996 | Roberts et al. .......... 280/491.3 |
| 5,540,006 A | 7/1996 | Lloyd |
| 5,556,217 A | 9/1996 | Deyo |
| 5,560,130 A | 10/1996 | Bapst |
| 5,662,176 A | 9/1997 | Madgwick |
| 5,746,404 A | 5/1998 | Merko |
| 5,809,779 A | 9/1998 | Bruso |
| 5,876,005 A | 3/1999 | Vasconi |
| 5,937,373 A | 8/1999 | Ferrar |
| 6,009,905 A | 1/2000 | Arnemann |
| 6,056,065 A | 5/2000 | Campbell |
| 6,125,868 A * | 10/2000 | Murphy et al. ................ 137/1 |
| 6,129,371 A * | 10/2000 | Powell .................... 280/461.1 |
| 6,131,391 A | 10/2000 | Poorman |
| 6,142,180 A * | 11/2000 | Woodling et al. ........... 137/615 |
| 6,155,359 A | 12/2000 | Gardner |
| 6,179,068 B1 | 1/2001 | West |
| 6,550,734 B1 | 4/2003 | Spadea |
| 6,701,913 B1 * | 3/2004 | LeDuc et al. ................. 126/30 |
| 7,036,606 B2 | 5/2006 | Rossi |
| 2001/0053970 A1 | 12/2001 | Ford |
| 2005/0076965 A1 | 4/2005 | Buckner |
| 2005/0166350 A1 | 8/2005 | Buckner |

OTHER PUBLICATIONS

E.H. Wachs Companies, "Wachs ValveCard 1.2", Product Manual, Sep. 1998, pp. 1-26.
The Wachs Company, "Automated Valve Operating Systems", pp. 1-6.
Exhibit A: Invoice of Hurco Technologies dated Jul. 23, 2002.
Exhibit B: Photograph of Prototype invoiced on Jul. 23, 2002.
Exhibit C: Photograph of Prototype invoiced on Jul. 23, 2002.
Exhibit D: Photograph of Prototype invoiced on Jul. 23, 2002.
Exhibit E: Photograph of Prototype invoiced on Jul. 23, 2002.

* cited by examiner

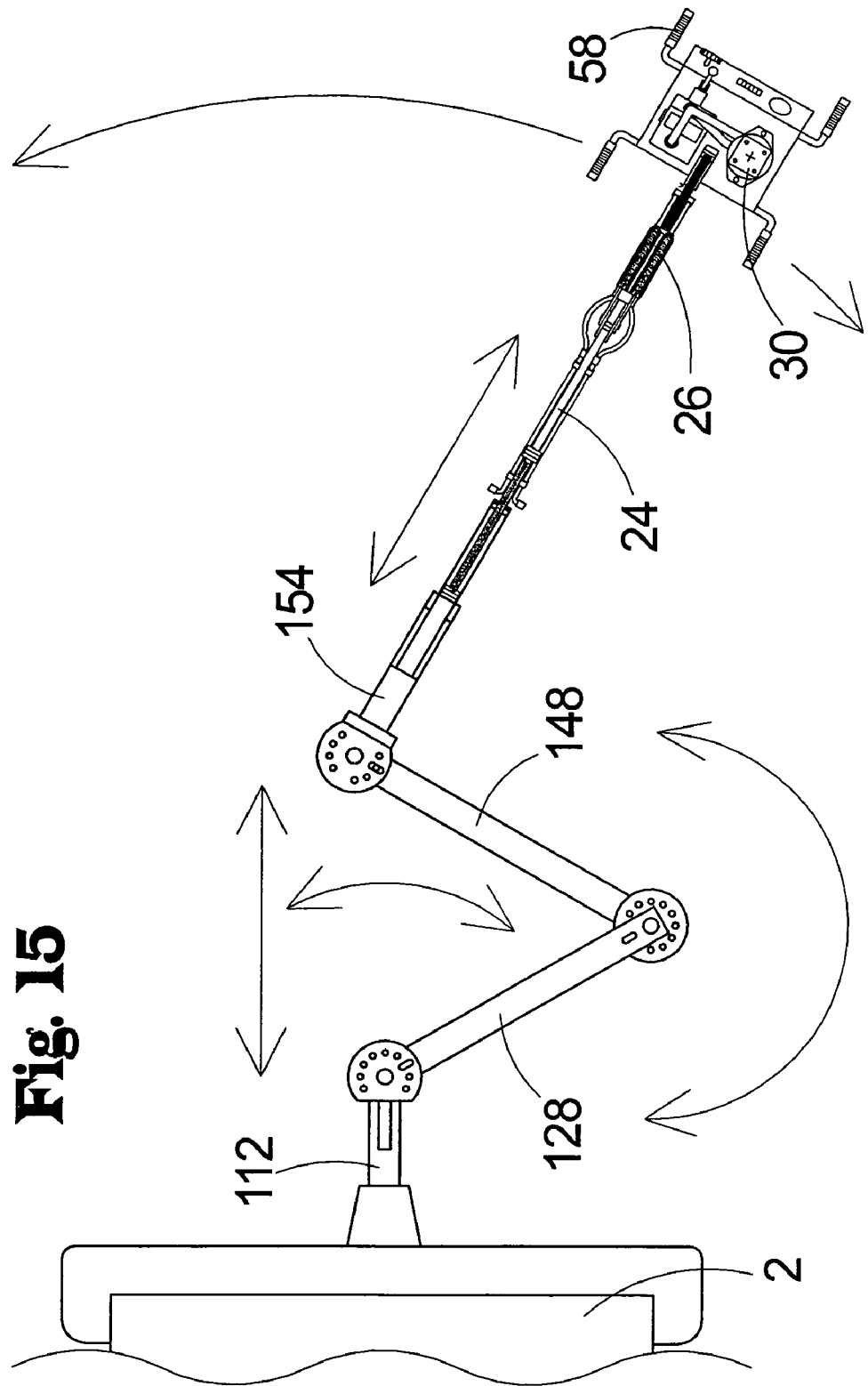

VALVE TESTER SUSPENSION ENHANCEMENTS

REFERENCE TO RELATED APPLICATION

This application is a continuation-in-part of my patent application Ser. No. 10/351,636, filed Jan. 24, 2003.

BACKGROUND OF THE INVENTION

1. Field of the Invention

The present invention relates to suspension assemblies and more particularly pertains to a new valve tester suspension assembly for allowing one person to perform the tasks necessary to test the underground valves.

2. Description of the Prior Art

The use of suspension assemblies is known in the prior art. U.S. Pat. No. 6,155,359 describes a vehicle mounted post hole digger. Another type of suspension assemblies is U.S. Pat. No. 4,869,002 and U.S. Pat. No. 5,540,006 each disclose a hydraulically operated digging arm attached to a vehicle. U.S. Pat. No. 4,883,249 discloses a counterbalancing mechanism for a constant force or load. U.S. Pat. No. 5,560,130 discloses a trenching apparatus pivotally mounted to a tractor. U.S. Pat. No. 5,746,404 discloses a wire and pulley internal spring counterbalancing mechanism. U.S. Pat. No. 5,876,005 discloses an articulated arm for supporting a camera from the cargo rack of an all-terrain vehicle. U.S. Pat. No. 4,463,858 discloses a reversible portable hoist lacking means for vertically aligning the hook of the device with a desired point on a supporting surface without moving the vehicle. U.S. Pat. No. 5,809,779 discloses an auxiliary hydraulic power unit of the type that would be used in association with the present invention.

While these devices fulfill their respective, particular objectives and requirements, it is believed that these devices do not present a suitable solution for suspending a valve testing or exercising apparatus is a manner that facilitates the testing process by a single person to that easily adapts to variations in the orientations or positions of the valves often encountered under real world conditions.

SUMMARY OF THE INVENTION

The present invention contemplates a valve tester assembly is disclosed that includes an articulated arm assembly having a first end and a second end, with the second end of the articulated arm assembly being movable away from and toward the first end such that when the first end of the articulated arm assembly is connected to a vehicle, the second end of the articulated arm assembly is movable away from and toward the vehicle. The assembly includes a rotation mechanism that is mounted on the articulated arm assembly toward the second end of the articulated arm for rotating a shaft for exercising a valve. The assembly further includes a moving mechanism that is mountable on a vehicle for moving the first end of the articulated arm assembly away from and towards the vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

One advantage of the valve tester suspension assembly of the present invention is that the task of operating or testing or exercising a valve is in most cases converted from a multiple person job to a job that can be performed by a single worker.

Another advantage of the valve tester suspension assembly of the present invention is that precise positioning of a vehicle carrying the invention is not necessary, and the efficiency of the process of testing underground valves is thereby increased.

Yet another advantage of the valve tester suspension assembly of the present invention is that not only is the task of testing the valve converted from a two person job into a one person job, but the physical requirements for the person performing the task is reduced, thus reducing the potential for injury or accidents.

Other advantages of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 15 is a schematic top view of the extended reach for the rotation assembly using the extended reach link assembly as compared to the articulated arm assembly alone.

DESCRIPTION OF THE PREFERRED EMBODIMENT

Figure 1:
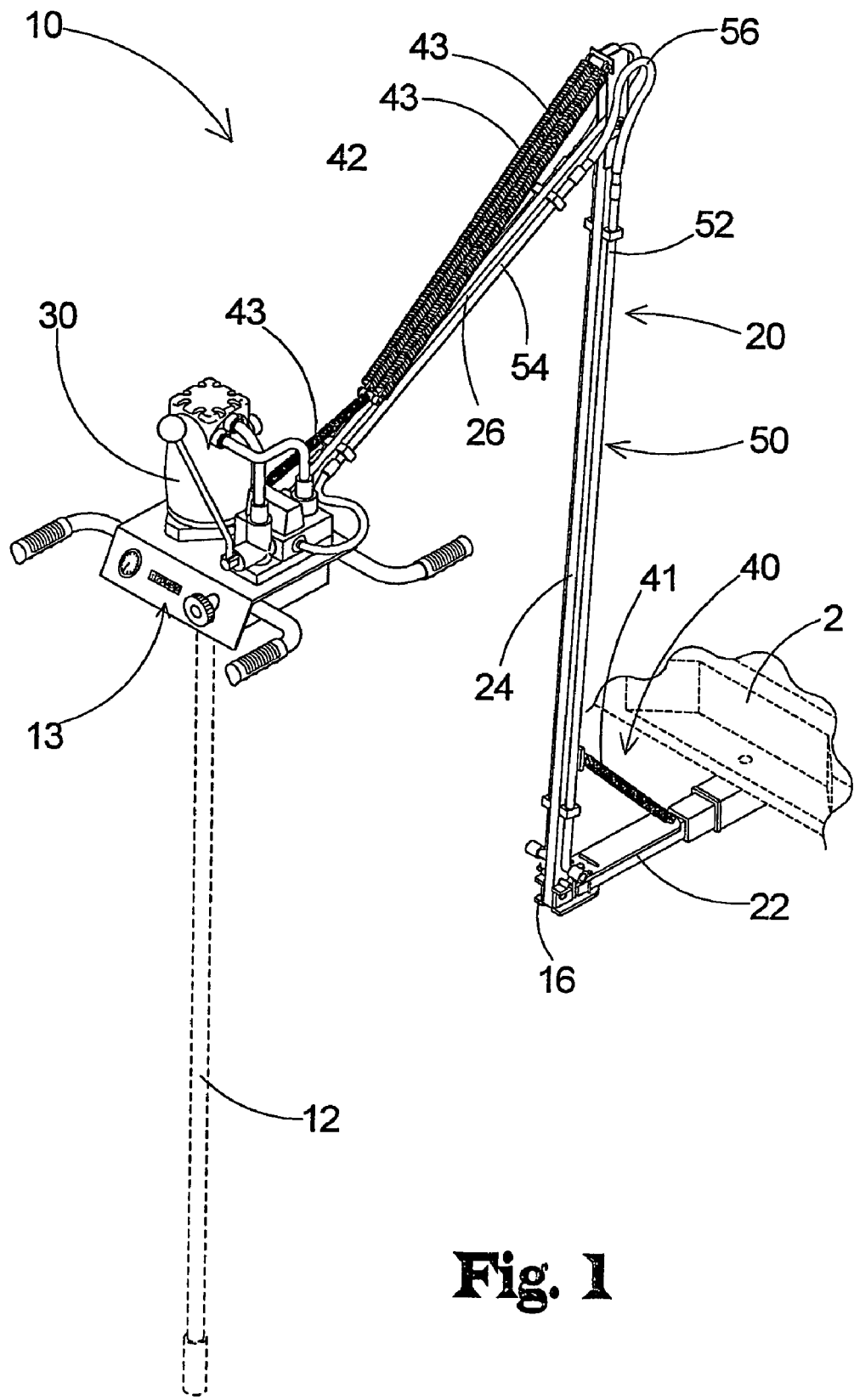
FIG. 1 is a perspective view of a new valve tester suspension assembly according to the present invention.
Figure 2:
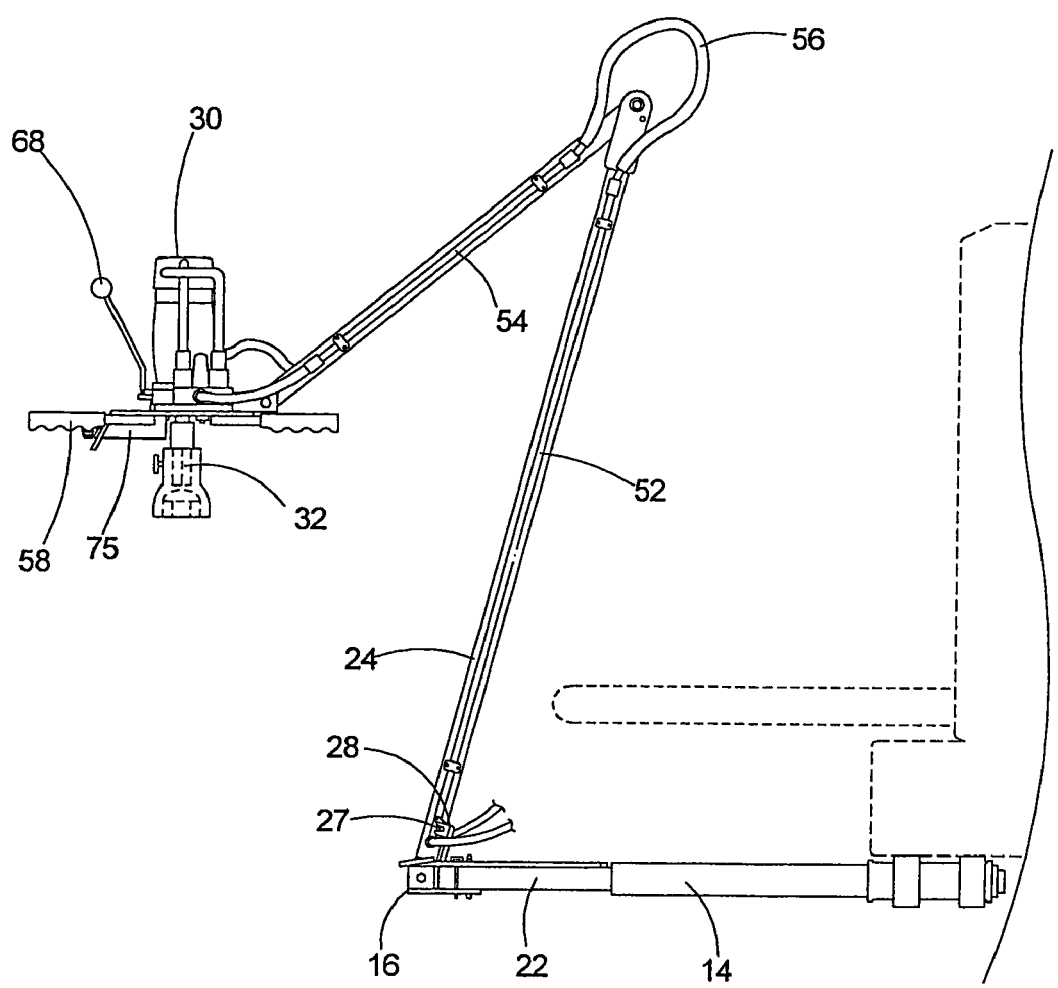
FIG. 2 is a side view of an embodiment of the present invention.
Figure 3:
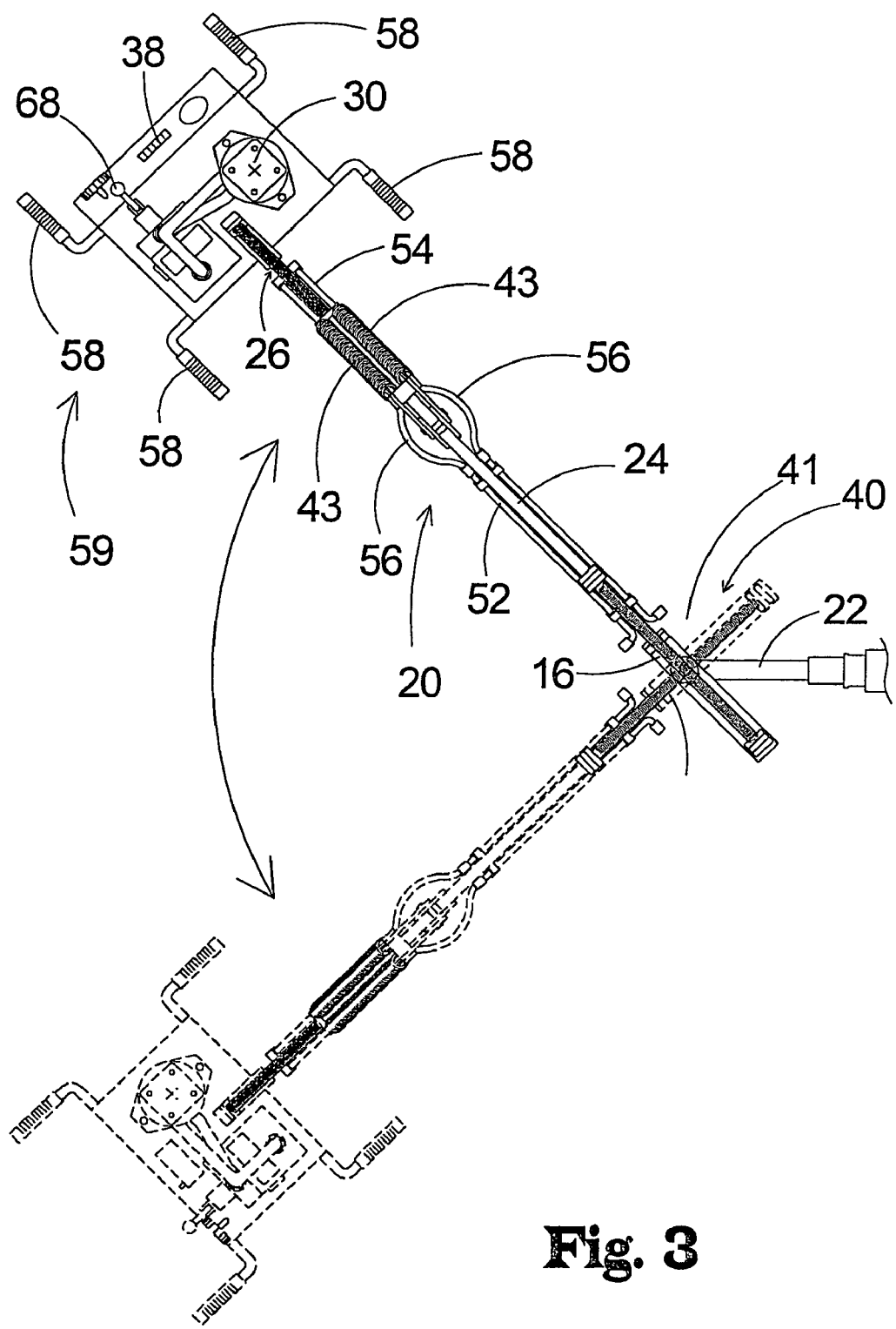
FIG. 3 is a perspective view of the present invention in an extended in use position.
Figure 4:
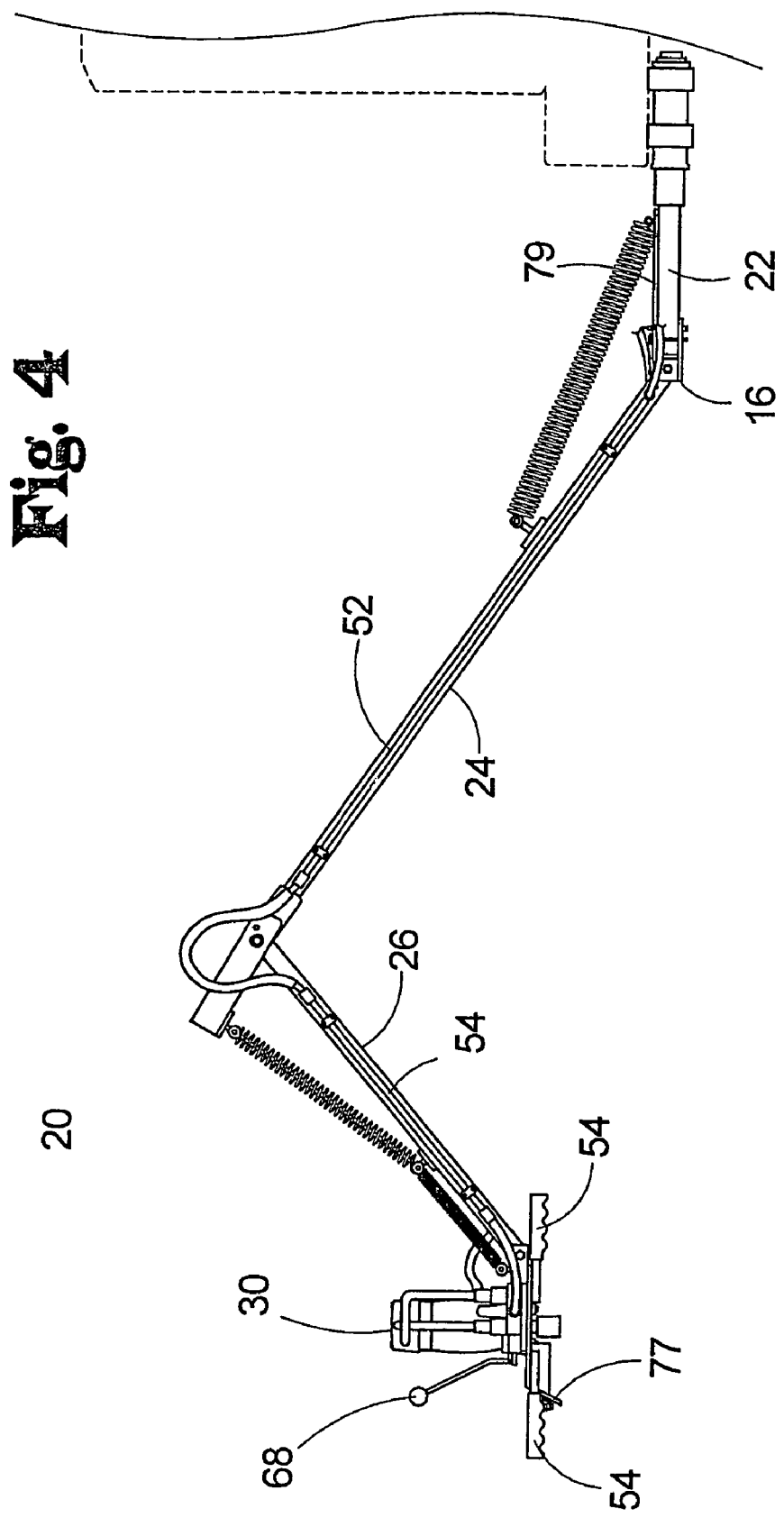
FIG. 4 is a side view of the present invention in an extended position resting on a ground surface.
Figure 5:
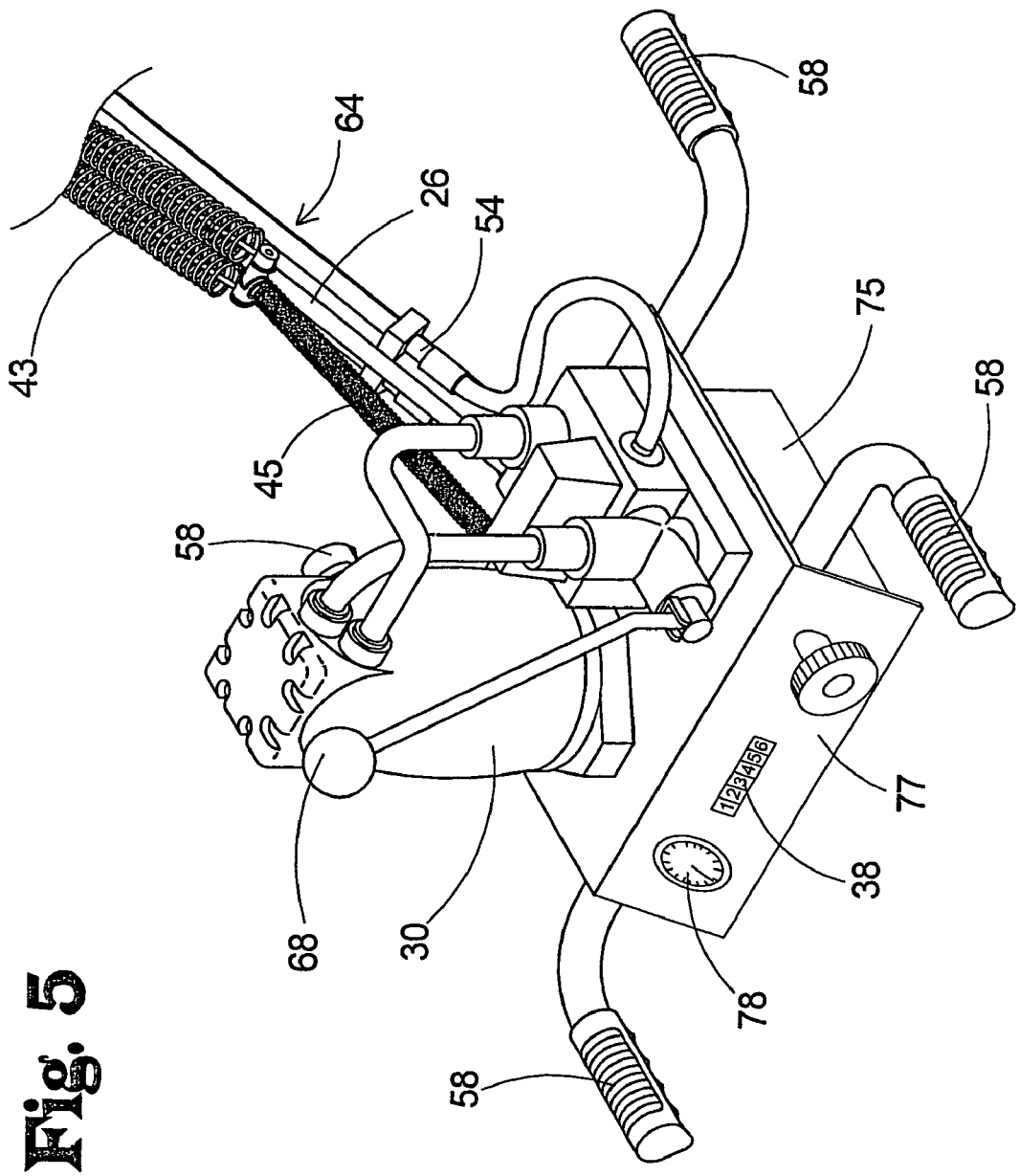
FIG. 5 is a perspective view of the rotating device of the present invention.
Figure 6:
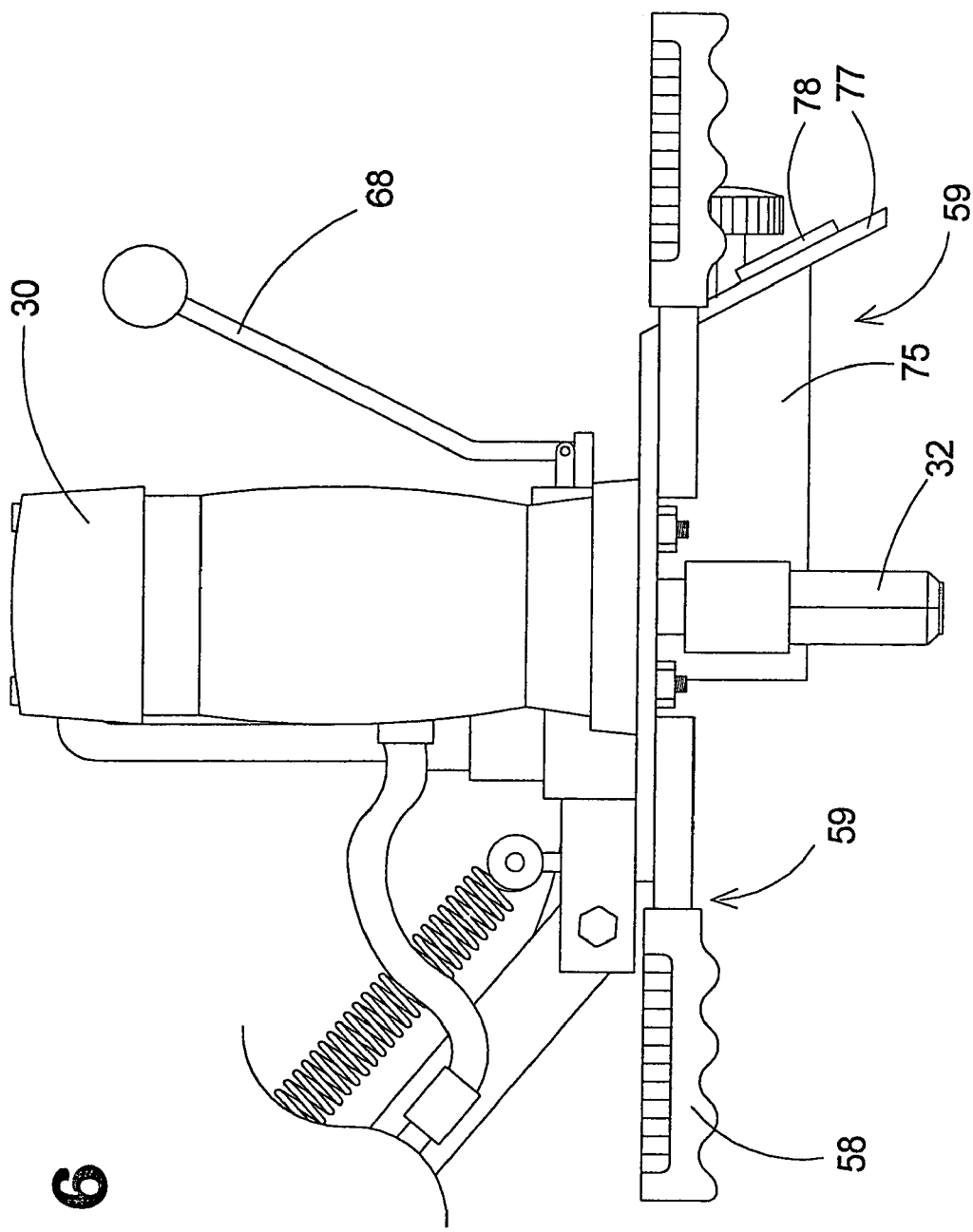
FIG. 6 is a side view of the rotating device of the present invention.

With reference now to the drawings, and in particular to FIGS. 1 through 15 thereof, a new valve tester suspension assembly embodying the principles and concepts of the present invention and generally designated by the reference numeral 10 will be described.

As best illustrated in FIGS. 1 through 12, the valve tester suspension assembly 10 generally comprises an articulated arm assembly 20 designed for coupling to a vehicle 2. A hydraulically powered rotating assembly 30 is pivotally coupled to the arm assembly 20 such that the rotating assembly 30 is positionable in a substantially horizontal orientation at a selectable position in a three dimensional space adjacent the vehicle 2. A shaft 12 is provided having a first end 13 operationally couplable to the rotating assembly 30 for rotating the shaft 12. Typically, the shaft has a receiving portion having a geometric cross-sectional shape for receiving a protrusion 32 rotated by the rotating assembly 30. An adapter 28 is attachable to the protrusion 32 to permit exercising of fire hydrant valves. Alternately, the protrusion may include a geometric cross-sectional receiver portion for engaging fire hydrant valves and the shaft may be shaped to engage the receiver portion of the protrusion.

The arm assembly includes a first arm portion 22 designed for coupling to the vehicle 2 by means such as a hitch on the vehicle. For the purposes of this application, the term vehicle is specifically intended to include any device or structure for transporting persons or things thereby including direct connection to a trailer supporting a hydraulic power source. The arm assembly further includes a second arm portion 24 pivotally and rotatably coupled to a distal end 23 of the first arm portion 22. The arm assembly 20 includes a third arm portion 26 pivotally coupled to a distal portion 25 of the second arm portion 24.

In an embodiment, a first biasing assembly 40 is coupled between the first arm portion 22 and the second arm portion 24. A second biasing assembly 42 is coupled between the second arm portion 24 and the third arm portion 26. A third biasing assembly 44 is coupled between the third arm portion 26 and the rotating assembly 30.

To achieve the pivotal and rotatable coupling between the first and second arm portions, the first arm portion has a pivoting connection portion 16. The second arm portion is pivotally coupled to the connection portion 16. Connection portion 16 further includes an extension portion 79 that extends back adjacent to a main portion 15 of first arm portion 22 when the main portion 15 and the connection portion 16 are positioned in alignment with each other. Biasing means 40 is coupled to the extension portion 79 such that biasing means 40 pivots with second arm portion 24 when connection portion 16 pivots.

Figure 7:
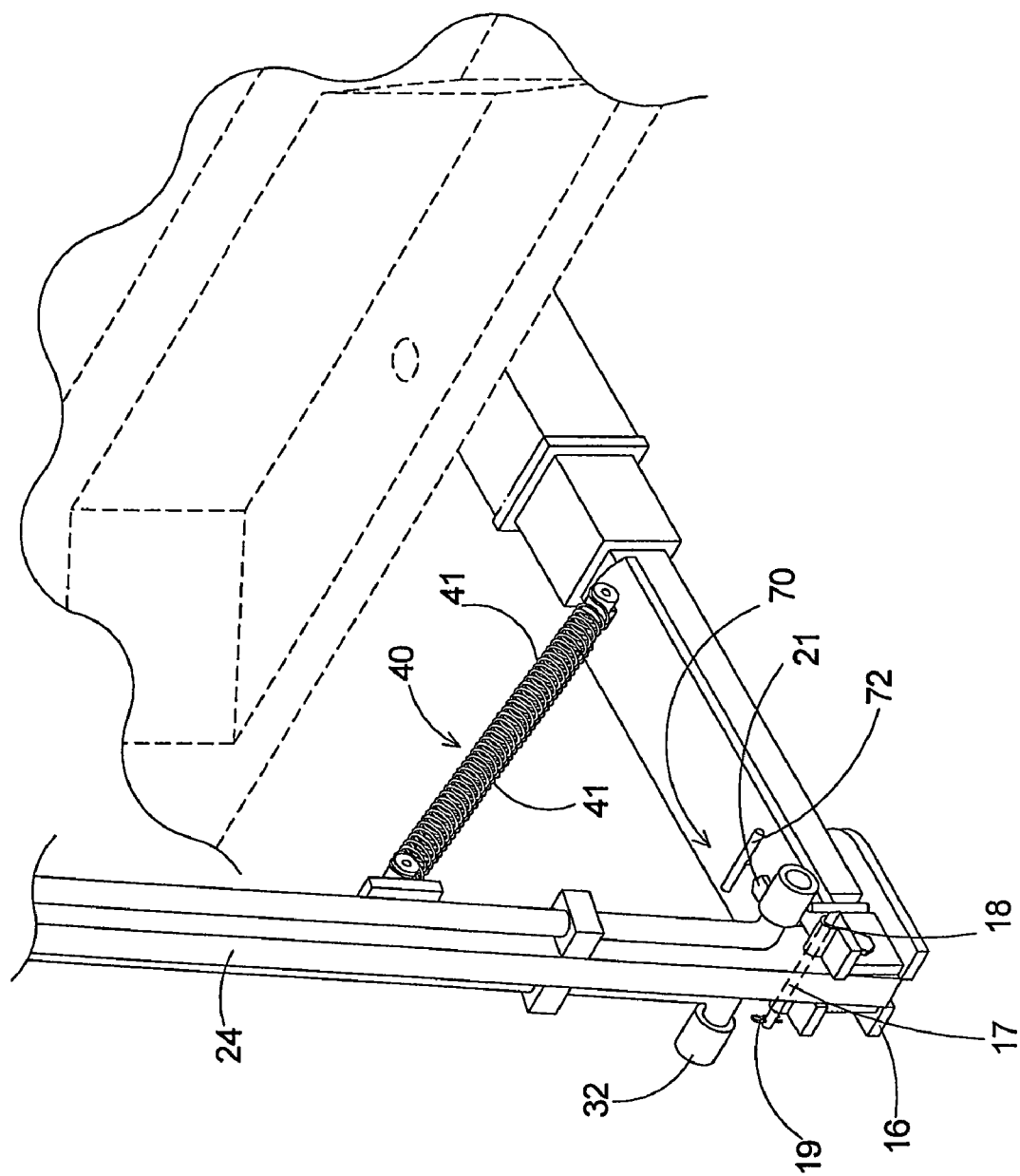
FIG. 7 is a perspective view of a proximal portion of the articulated arm of the present invention.
Figure 8:
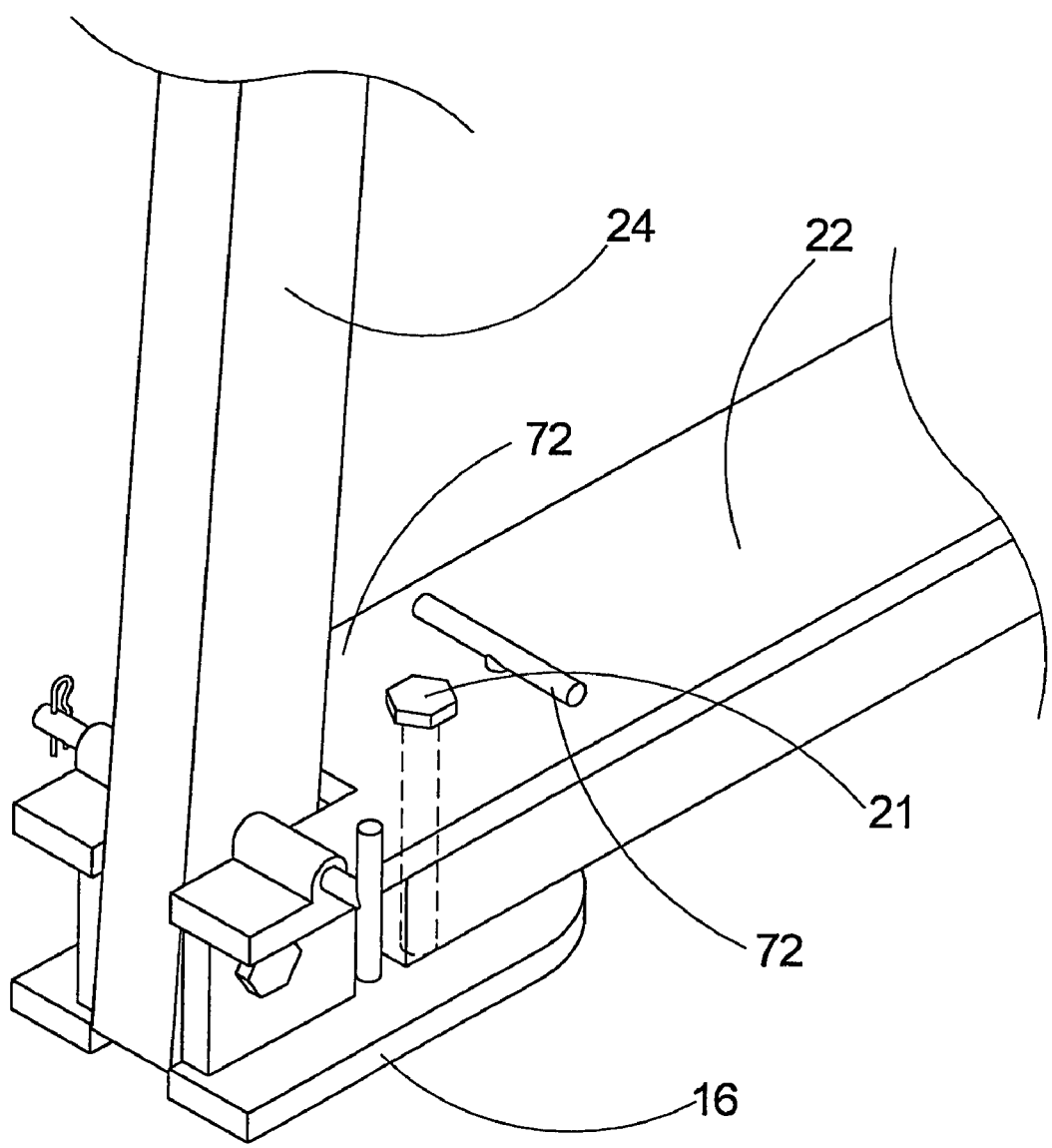
FIG. 8 is a perspective view of a locking means of the present invention.
Figure 9:
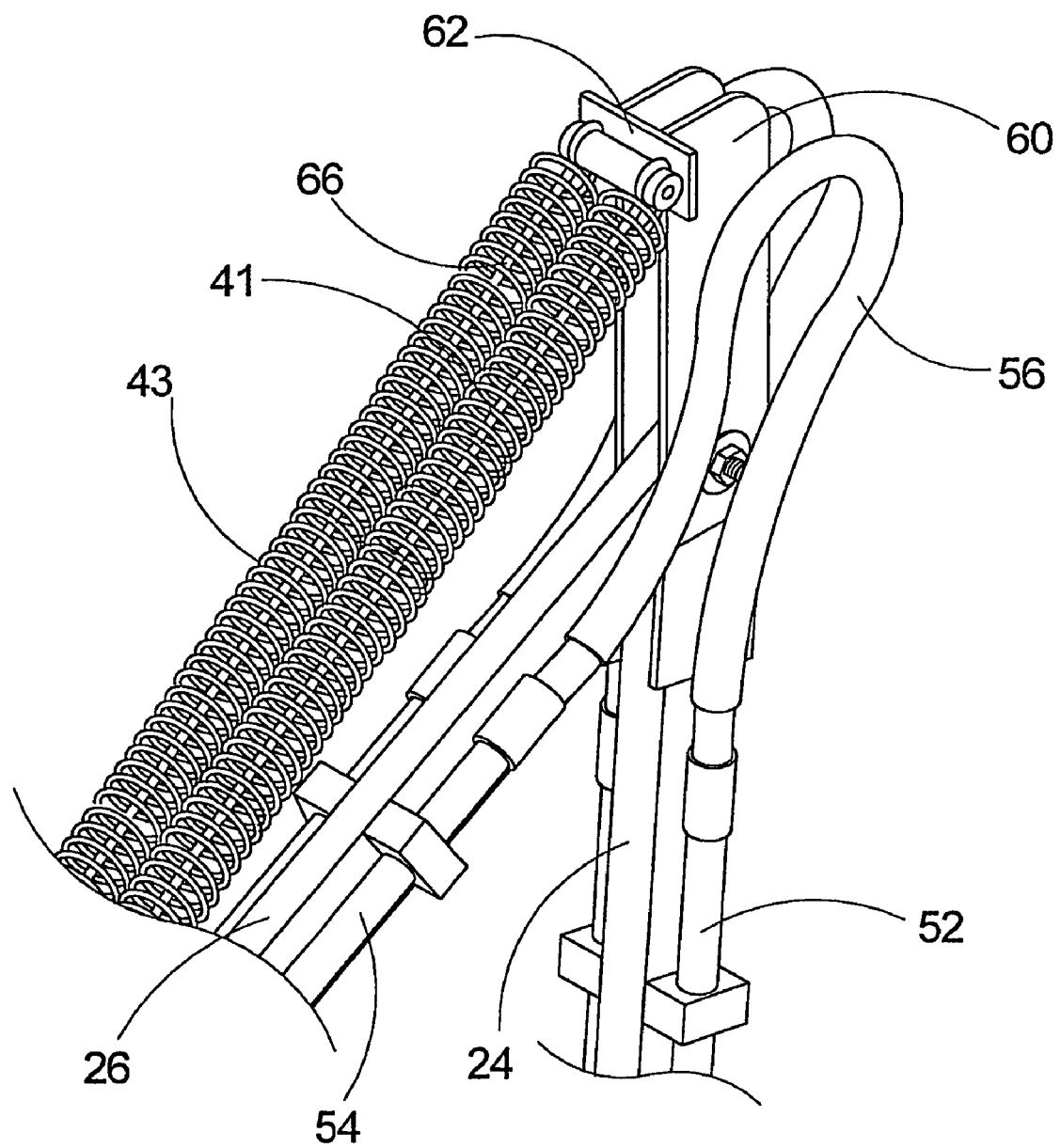
FIG. 9 is a perspective view of a medial portion of the articulated arm of the present invention.
Figure 10:
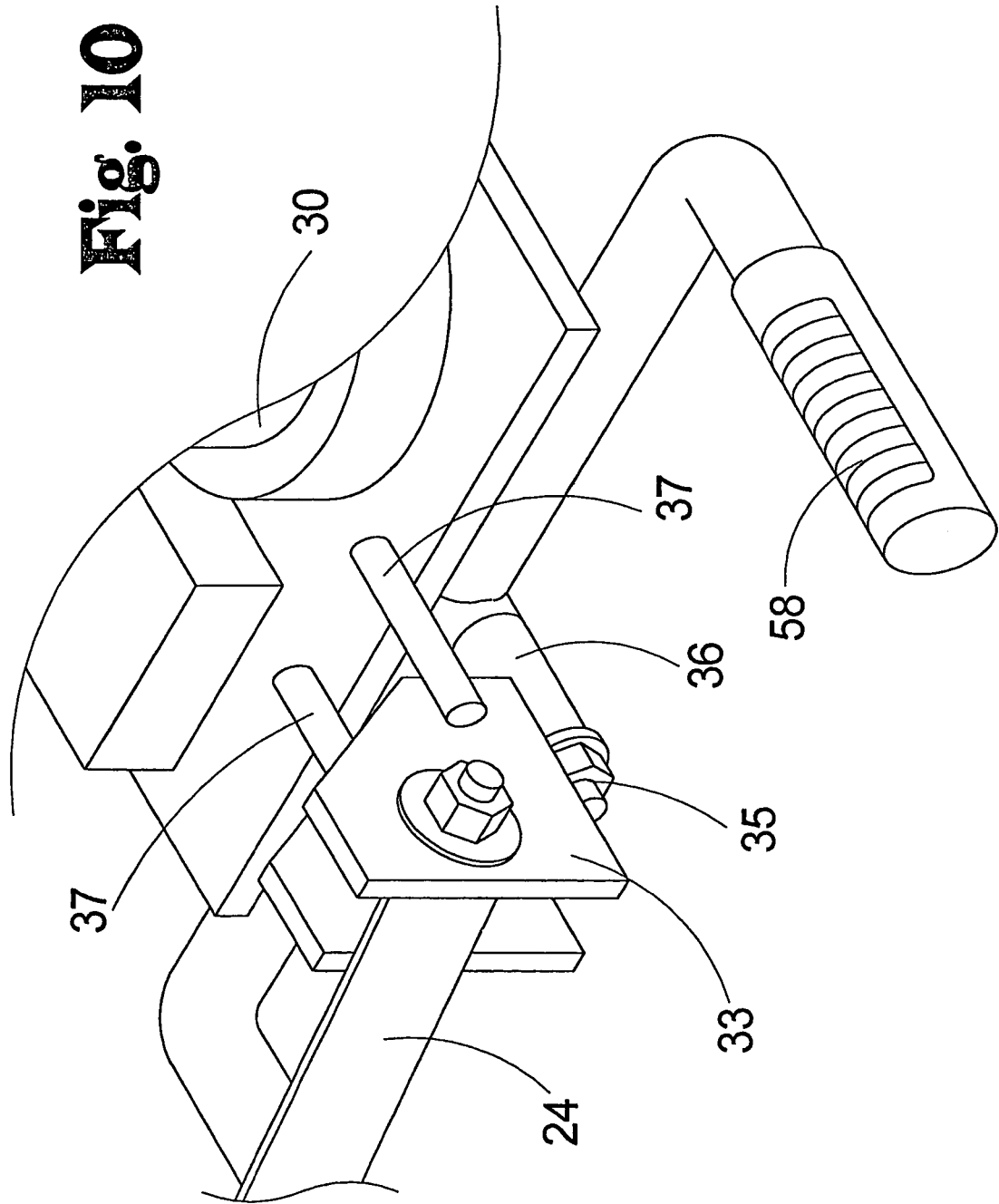
FIG. 10 is a perspective bottom view of an embodiment of the invention.

Hydraulic supply line assemblies 50 are coupled to the arm assembly 20 for providing hydraulic power to the rotating assembly 30. Each hydraulic line assembly includes a first fixed portion 52 coupled to the second arm portion 24. Each hydraulic line assembly 50 further includes a second fixed portion 54 coupled to the third arm portion 26. Each hydraulic line assembly 50 includes a flexible portion 56 coupling the first fixed portion 52 to the second fixed portion 54. A protective covering 69 is coupled to the flexible portion 56 of each hydraulic line assembly 50. Each second fixed portion 54 is operationally coupled to a respective one of an input and an output on the rotating assembly such that each of the hydraulic line assemblies forms either an inlet line or an outlet line. The connectors, as shown in FIG. 7, are differentiated to insure the inlet line and the outlet line are not reversed when connecting the invention to an auxiliary hydraulic power unit.

In the biased embodiment, the first biasing assembly 40 is a pair of first biasing assembly spring members 41 and the second biasing assembly 42 is a pair of second biasing assembly spring members 43. Each of the second pair of second biasing assembly spring members 43 is coupled between a distal end 60 of an extension portion 62 of the second arm portion 24 and a medial portion 64 of the third arm portion 26. Extension portion 62 may be a separate piece attached to second arm portion 24 or may be an integral extension of second arm portion 24. The third biasing assembly 44 is a single third biasing assembly spring member 45.

To enhance the safety of the biased embodiment in the event of catastrophic failure of a spring member, each spring member of the first, second and third biasing assemblies has a respective elastic core member 66 extending through the spring member.

A hydraulic control mechanism 68 is coupled to the rotating assembly 30 for facilitating user operation of the rotating assembly 30. Corresponding to the currently used practice for testing underground valves, a counter 38 is coupled to a display flange 77 of the rotating assembly 30 for counting rotations of the shaft 12. Additionally, a torque indicator gauge 78 is operationally coupled to the rotating assembly to indicate torque on the rotating assembly. This provides a new method of testing alternative to counting rotations of the shaft. A torque adjustment means 75 is operationally coupled to the rotating assembly for adjusting the amount of torque applied by the rotating assembly 30 to prevent overstressing of the valve assembly being exercised.

A first locking means 70 is provided for locking the second arm portion 24 from rotating relative to the first arm portion 22. A second locking means 76 is provided for locking the second arm portion 24 from pivoting relative to the first arm portion 22.

The first locking means 70 is a pin 72 insertable through the first arm portion 22 and the connection portion 16 in spaced relationship to a rotational pivot point 21 of the connection portion 16. Thus, the connection portion 16 is held in position by pin 72.

Figure 11:
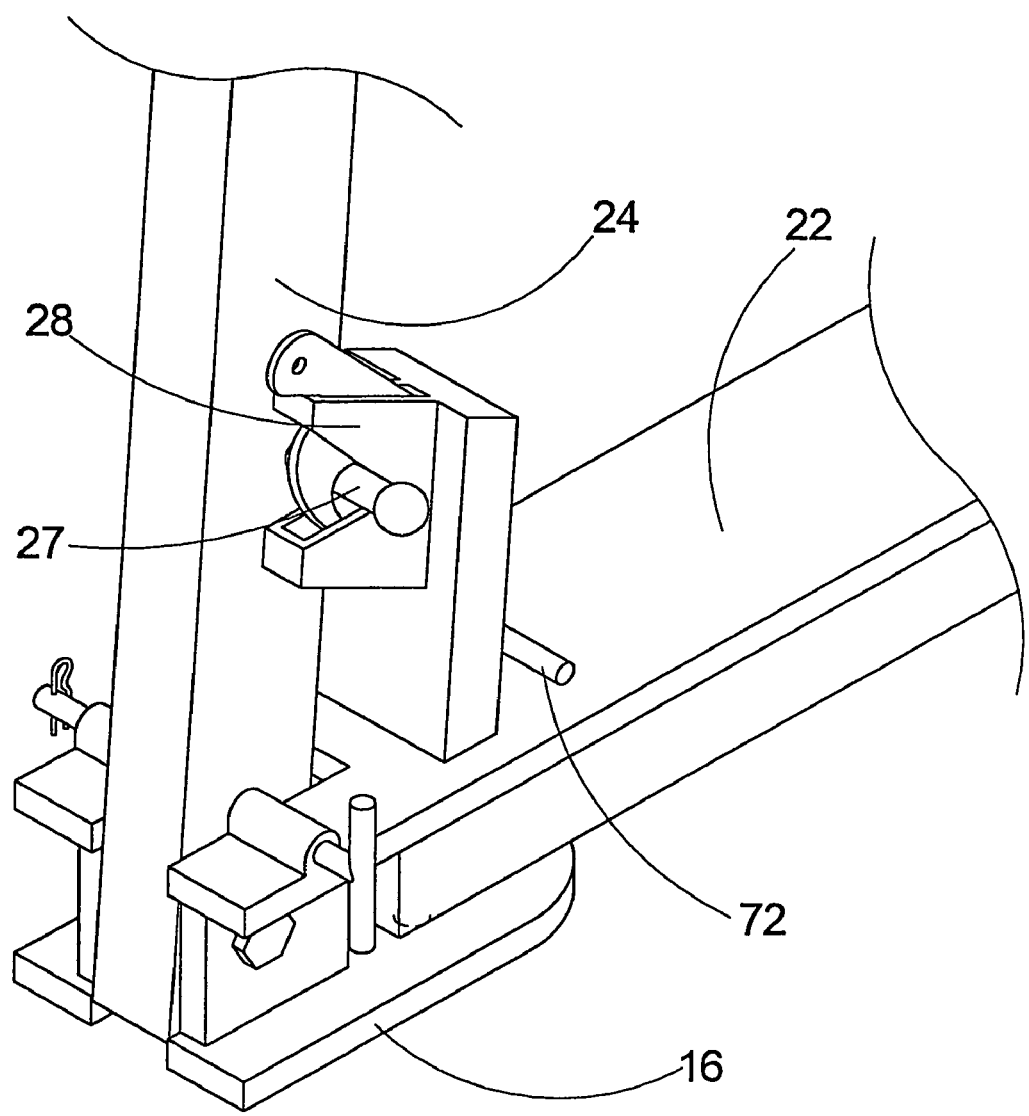
FIG. 11 is a perspective view of an alternate locking means for the articulated arm assembly.
Figure 12:
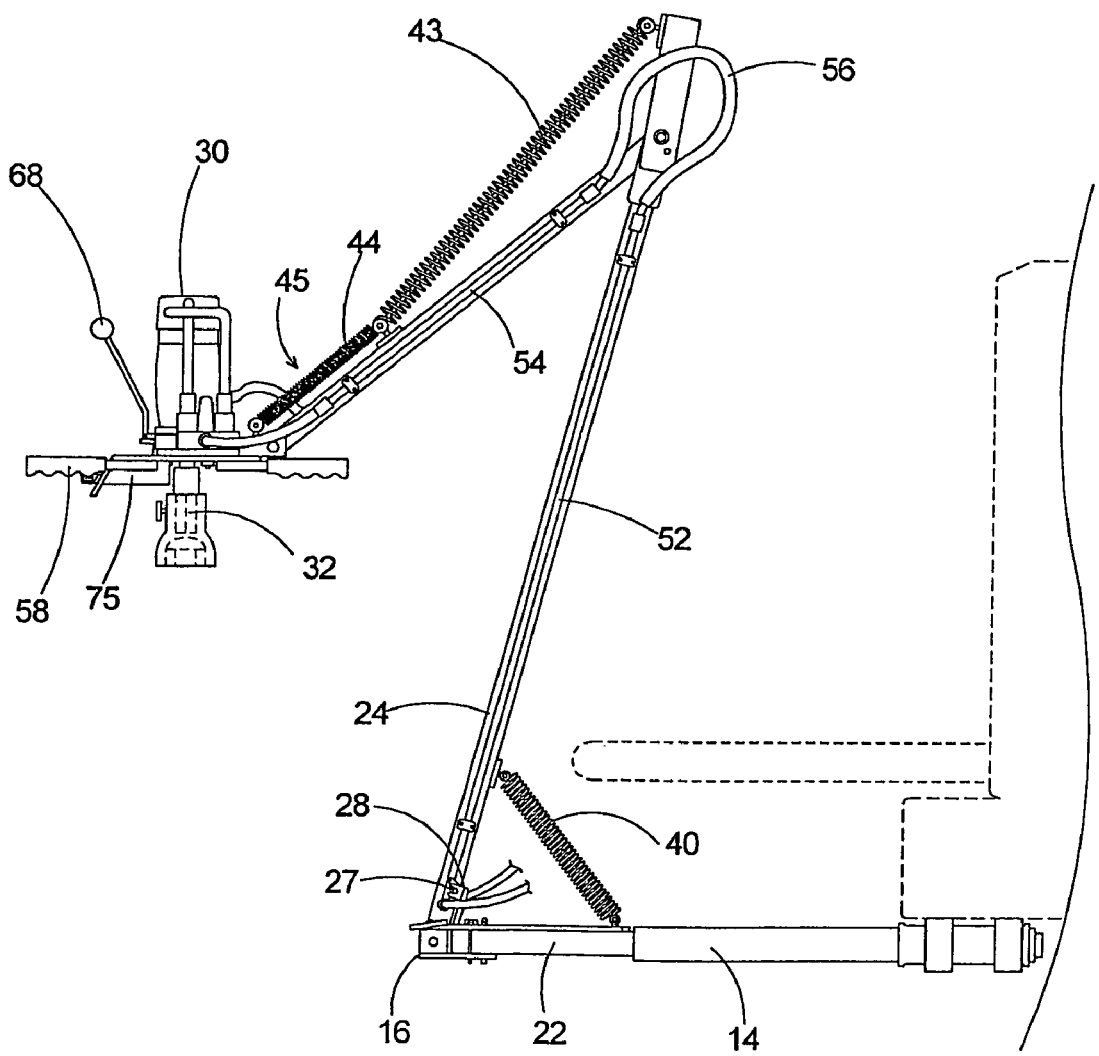
FIG. 12 is a side view of the present invention in a retracted position.
Figure 13:
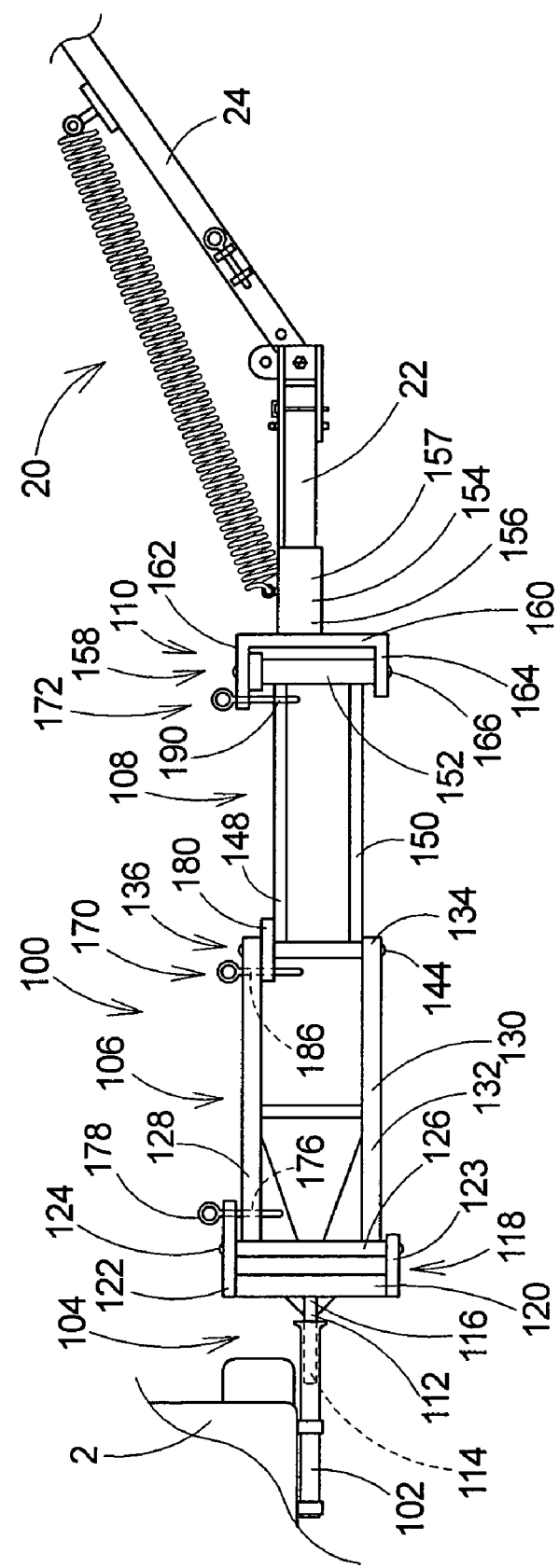
FIG. 13 is a schematic side view of the extended reach link assembly of the present invention.
Figure 14:
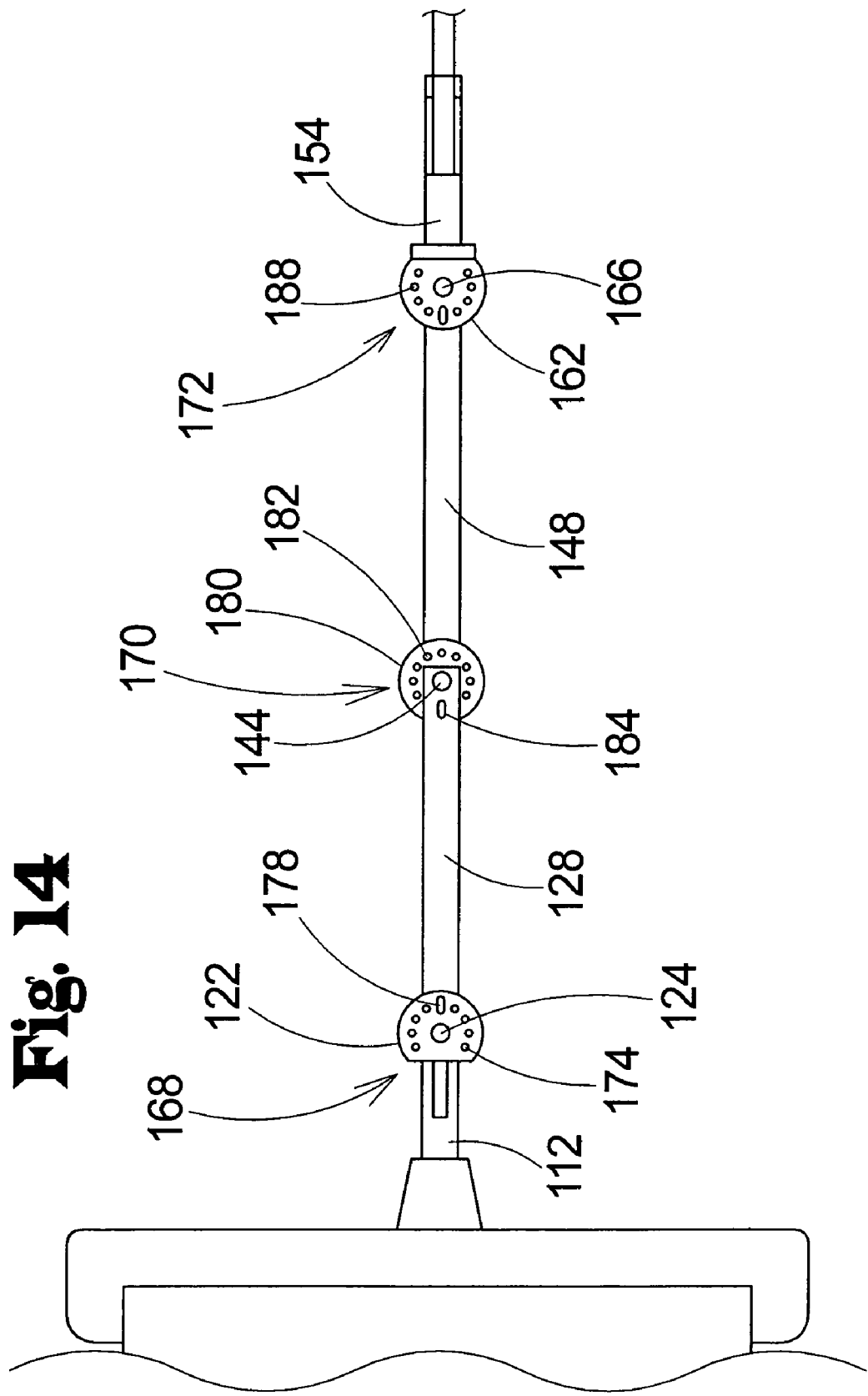
FIG. 14 is a schematic top view of the extended reach link assembly of the present invention.

The second locking means 76 includes a pair of aligned holed flanges 74 in the connection portion 16 of the first arm portion 22. The second arm portion 24 includes a locking aperture 17 alignable with holes 18 in the flanges 74. A locking pin 19 is insertable through the aligned holes 18 and aperture 17 whereby the second arm 24 is prevented from pivoting relative to the connection portion 16 of the first arm portion 22. Additionally, in an embodiment, the second locking means 76 may be a locking bar 27 extending from the second arm portion 24 for engaging a latch member 28 fixedly coupled to the first arm portion 22 as shown in FIG. 11. The locking bar and latch member may be used alone for securing the arm assembly during relatively short trips between valve sites or in combination with the locking pin 19 and aligned holes 18 for maximum stability as desired. The invention may include either one of the above described locking structures or both in combination as each provides unique advantages.

Optionally, an extension member 14 is couplable between the articulated arm assembly 20 and the vehicle 2 for spacing the second arm portion 24 from the vehicle 2 to permit free movement of the second arm portion 24 when a tailgate of the vehicle is in an open position.

A plurality of handles 58 are coupled to the rotating assembly 30 for facilitating grasping and movement of the rotating assembly 30. The handles 58 are being arranged to form two opposing handle pairs 59. The handle pairs 59 are substantially aligned with respect to each other.

In an embodiment, the rotating assembly 30 is coupled to the articulated arm assembly such that the rotating assembly is pivotable around a horizontal axis to permit positioning of the rotating assembly 30 in a desired position to engage valves that are not in perfect horizontal alignment such that the shaft is in a non-vertical position when engaged to the valve. The coupling of the rotating assembly 30 is achieved by having a post 35 extend from the rotating portion. A rotating assembly connection member 33 includes a bearing portion 36 secured to the post 35 and a pair of limiting bars 37 that extend out from the rotating assembly connection member 33 to contact the rotating assembly to limit the pivoting range of the rotating assembly around the horizontal axis.

In use, the articulated arm assembly is coupled to a vehicle using a conventional hitch mounted anywhere on the vehicle including the front or back. The vehicle can be driven to a position adjacent an access port in the road that gives access to an underground valve. The invention permits positioning of the vehicle anywhere within a range of the access port so that the vehicle does not have to be moved to precisely align the rotating device with the access port. Typically, the valve being tested is positioned a distance beneath the road, often 4 to six feet. A shaft, which may have an adjustable length either by being telescopic or having a one or more extension pieces, is engaged to the valve. The articulated arm is unlocked to permit free movement of the arm by a single person. The rotating device, typically a heavy hydraulically powered device, is then grasped and may be positioned by a single person.

When the biasing assemblies are used the weight of the rotating device is partially supported by the biasing in the articulated arm. Adjustments to the amount of support can be achieved through the use of multiple interchangeable springs or other known methods of varying the resistance of a biasing member.

The pivoting of the articulated arm permits movement of the rotating device within a three dimensional space while holding the rotating device in the necessary substantially horizontal orientation. Additional pivoting of the rotating device is provided to facilitate attachment of the rotating device to shafts when the shaft is slightly off vertical orientation as may happen when the valve is in a slightly tilted position. The rotating device can be positioned immediately over the shaft and then lowered to engage the shaft. The rotating device remains in engagement with the shaft by the residual weight of the rotating device not supported by the articulated arm or the user. The user may also push downwardly on the rotating device during use if desired or otherwise deemed necessary.

Typically, the testing is done by loosening and re-tightening a number of rotations. In an embodiment, a counter is used to count the number of rotations to facilitate the current testing methods. Alternately, torque measurement style testing is now facilitated by the present invention if the invention is equipped for measuring or responding to pre-determined torque conditions during rotation. Upon completion of the testing, the rotating device is disengaged from the shaft and the articulated arm returned to a storage or retracted position and then locked into place to permit safe movement of the vehicle to the next testing place. This new method provides a significant increase in efficiency allowing many more valves to be tested in a given amount of time.

Through use of the adapter described above or through integral shaping of the protrusion of the rotating device, the rotating device may also be engaged to fire hydrant valves as desired.

In one embodiment of the invention that includes variations that may be employed with the above-described elements of the invention, an extended reach link assembly (see FIGS. 13 through 15) may be employed between the first portion 22 of the articulated arm assembly 20 and the vehicle 2 which provides a significant increase in the range of positions for the rotating assembly 30, including positions that are further from the vehicle due to the added length of the overall apparatus, and in the illustrative embodiment of the invention, the reach of the rotating assembly is extended to approximately 13 feet (approximately 4 meters) or more. Surprisingly, the extended reach link assembly also facilitates the positioning of the rotating assembly 30 significantly closer to the vehicle than with the articulated arm assembly 20 alone. The extended reach link assembly thus permits movement of the rotating assembly to positions, such as adjacent to the vehicle bumper, that might not otherwise be reachable due to the inherent length of the articulated arm assembly 20 of the invention. Perhaps even more significantly, this extended reach is provided without creating regions or areas (between the vehicle and the outer radius of reach) where the rotating assembly 30 cannot be positioned. The significantly enhanced degree of adjustment facilitates the appropriate positioning of the vehicle with respect to the valve to be exercised, as less precise positioning of the vehicle with respect to the valve location is needed.

The extended reach link assembly 100 is most preferably mounted on the vehicle, such as by using the hitch receiver tube 102 located on most service vehicles 2. The extended reach link assembly 100 may include a mounting portion 104, an inboard link portion 106, an outboard link portion 108, and an interface portion for mounting to the articulated arm assembly 20.

The mounting portion 104 is mountable on the hitch receiver tube 102 on the vehicle 2. The mounting portion 104 may be adapted for being inserted into the hitch receiver 102 of the vehicle 2 so that the extended reach link assembly 100 is located at the rear of the vehicle, although other locations on the vehicle may be suitable for mounting the link assembly 100 and the articulated arm assembly 20 of the invention. The mounting portion 104 may comprise a mounting bar 112 that has a first end 114 and a second end 116, the first end 114 being insertable into the hitch receiver 102. The mounting portion 104 may also include a first pivot component 118 that is mounted on the second end 116 of the mounting bar 112. The first pivot component 118 may include a first span member 120 that is mounted on the second end 116 of the mounting bar 112. The first span member 102 may extend in a substantially vertical direction when the extended reach link assembly 100 is mounted on a vehicle 2. The first pivot component 118 may also include a first pair of spaced ears 122, 123 mounted on the first span member 120, and the first pair may comprise an upper ear 122 and a lower ear 123. The upper 122 and lower 123 ears may be spaced from each other in a substantially vertical direction. The first pivot component 118 may further include a first pivot post 124 extends between the first pair of spaced ears 122, 123. The first pivot post 124 may be substantially vertically oriented when the extended reach link assembly 100 is mounted on a vehicle 2.

The inboard link portion 106 is pivotally mounted to the mounting portion 104. In a highly preferred embodiment of the invention, the inboard link portion 106 has an adjustable length such that a distance between the mounting portion 104 of the extended reach link assembly 100 and the outboard link portion 108 is adjustable to permit even more flexibility in positioning the articulated arm assembly 20 and the rotating assembly 30.

The inboard link portion 106 may include a first sleeve 126 for receiving the pivot post 124 of the first pivot component 118. The inboard link portion 106 may also include at least one, and optionally two, inboard link members 128, 130. The inboard link members 128, 130 may be oriented in a spaced, substantially parallel relationship to each other. The inboard link members 128, 130 may have each have a first end 132 and a second end 134, with the first end 132 of each of the inboard link members 128, 130 being mounted on the first sleeve 126, and the second end 134 of each of the inboard link members 128, 130 being substantially free for connection to the components of the outboard link portion 108 that will now be described.

The outboard link portion 108 is pivotally mounted to the inboard link portion 106 so that the outboard link portion 108 may be pivoted with respect to the inboard link portion 106 and in turn the mounting portion 104 of the extended reach link assembly 100. A second pivot component 136 may be provided for pivotally mounting the outboard link portion 108 to the inboard link portion 106, and more particularly to the inboard link members 128, 130 thereof. The second pivot component 136 may comprise a second pivot post 144 that extends between the second ends 134 of the inboard link members 128, 130, and the second pivot post 144 may be substantially vertically oriented when the extended reach link assembly 100 is mounted on a vehicle 2. The second pivot component 136 may also comprise a second sleeve 146 on the outboard link portion 108 that receives the second pivot post 144 of the inboard link portion 106 in a pivotal manner. The outboard link portion 108 may also comprise at least one, and optionally two, outboard link members 148, 150 that are mounted on the second sleeve 146. In one embodiment of the invention, the outboard link members 148, 150 and the second sleeve 146 may be positioned between the second ends 134 of the inboard link members 128, 130. The outboard link members 148, 150 may be oriented in a spaced, substantially parallel relationship to each other.

The outboard link portion 108 may further comprise a third sleeve 152 that is mounted on the outboard link members 148, 150 at a location on the outboard link members that is opposite of the location of the connection of the second sleeve 146 to the link members. The third sleeve 152 may be oriented substantially parallel to the second sleeve 146.

The interface portion 110 is adapted for mounting to the first portion 22 of the articulated arm assembly 20, and in some embodiments of the invention the interface portion 110 and the first portion 20 are integral with each other, while in other embodiments the first portion 20 of the articulated arm assembly 20 may be removably mounted on the interface portion 10 of the extended reach link assembly 100. The interface portion 110 may be pivotally mounted to the outboard link portion 108. The interface portion 110 may comprise a receiver 154 for receiving a portion of the first portion 20 of the articulated arm assembly 20, and in some embodiments, the receiver 154 may be integrally formed with the first portion 20 of the articulated arm assembly 20. The receiver 154 may have a first end 156 and a second end 157.

The interface portion 110 may also include a third pivot component 158 that is mounted on the receiver 154, such as one the first end 156 of the receiver 154. The third pivot component 158 may include a third span member 160 that is mounted on the receiver 154. The third span member 160 may extend in a substantially vertical direction when the extended reach link assembly 100 is mounted on a vehicle 2. The third pivot component 158 may also include a third pair of spaced ears 162, 164 that are mounted on the third span member 160. The third pair of spaced ears 162, 164 may include an upper ear 162 and a lower ear 164. The upper 162 and lower 164 ears may be spaced from each other in a substantially vertical direction when the extended reach link assembly 100 is mounted on a vehicle 2. The third pivot component 158 may further comprise a third pivot post 166 that extends through the third sleeve 152 of the outboard link portion 108. The third pivot post 166 may extend between the third pair of spaced ears 160, 162, and may be substantially vertically oriented when the extended reach link assembly 100 is mounted on a vehicle 2.

The extended reach link assembly 100 may also include means for selectively and releasably locking the pivot position of various portions of the link assembly 100 with respect to each other. The link assembly 100 may thus include a first position locking mechanism 168 for locking a pivot position of the inboard link portion 106 of the link assembly 100 with respect to the mounting portion 104 of the link assembly. Additionally, the link assembly 100 may also include a second position locking mechanism 170 for locking a pivot position of the outboard link portion 108 of the link assembly with respect to the inboard link portion 106 of the link assembly. Still further, the link assembly 100 may also include a third position locking mechanism 172 for locking a pivot position of the interface portion 110 of the link assembly 100 with respect to the outboard link portion 108 of the link assembly.

The first position locking mechanism 168 may include a plurality of apertures 174 formed on one of the spaced ears 122, 123 of the first pivot component 118. The plurality of apertures 174 is preferably centered about the first pivot post 124. The first position locking mechanism 168 may also include a first locking aperture 176 formed in one of the inboard link members 128, 130 of the inboard link portion 106 of the link assembly 100. The first locking aperture 176 is alignable with each of the plurality of apertures 174 such that the first locking aperture 176 and a selected one of the plurality of apertures 174 is capable of receiving a locking pin 180 to lock the mounting portion 104 and the inboard link portion 106 of the link assembly 100 in a selected pivoted position.

The second position locking mechanism 170 may include a selector plate 180 mounted on the outboard link portion 108. The selector plate 80 may be mounted on the second sleeve 146 of the outboard link portion 108, and in some embodiments is located above the upper outboard link member 148. A plurality of apertures 182 may be formed on the selector plate 180, and may be substantially centered about an opening 184 receiving the second pivot post 144 of the inboard link portion 106. The second position locking mechanism 170 may further include a second locking aperture 186 formed in the inboard link portion 106 of the link assembly 100. The second locking aperture 186 may be located in the upper inboard link member 128 of the inboard link portion 106. The second locking aperture 186 is alignable with each of the plurality of apertures 182 such that the second locking aperture 186 and a selected one of the plurality of apertures 186 is capable of receiving a locking pin to lock the inboard link portion 106 and the outboard link portion 108 of the link assembly 100 in a selected pivoted position.

The third position locking mechanism 172 may include a plurality of apertures 188 formed on one of the spaced ears 162, 164 of the third pivot component 158. The plurality of apertures 188 may be centered about the third pivot post 166. The third position locking mechanism 172 may also include a third locking aperture 190 formed in the outboard link portion 108 of the link assembly 100. The third locking aperture 190 may be formed in one on the outboard link members 148, 150 of the outboard link portion 108 of the link assembly 100. The third locking aperture 190 may be alignable with each of the plurality of apertures 188 such that the third locking aperture 109 and a selected one of the plurality of apertures 188 is capable of receiving a locking pin to lock the interface portion 110 and the outboard link portion 108 of the link assembly 100 in a selected pivoted position.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Further, unless particular features are mutually exclusive, all of the various combinations of the features are intended to be encompassed by the invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A valve tester assembly comprising:
  an articulated arm assembly having a first end and a second end, the second end of the articulated arm assembly being movable away from and toward the first end such that when the first end of the articulated arm assembly is connected to a vehicle, the second end of the articulated arm assembly is movable away from and toward the vehicle;
  rotation means mounted on the articulated arm assembly toward the second end of the articulated arm for rotating a shaft for exercising a valve; and
  moving means mountable on a vehicle for moving the first end of the articulated arm assembly away from and towards the vehicle;
  wherein the moving means comprises an extended reach link assembly for mounting on the vehicle, the extended reach link assembly including:
    a mounting portion for mounting on the vehicle;
    an inboard link portion pivotally mounted to the mounting portion;
    an outboard link portion pivotally mounted to the inboard link portion; and
    an interface portion for mounting to the first end of the articulated arm assembly, the interface portion being pivotally mounted to the outboard link portion;
  wherein the inboard link portion comprises a first sleeve for receiving a pivot post of the mounting portion;
  wherein the outboard link portion comprises a second sleeve receiving a second pivot post of the inboard link portion in a pivotal manner, at least one outboard link member being mounted on the second sleeve, and a third sleeve mounted on the at least one outboard link member opposite of the second sleeve.

2. The valve tester assembly of claim 1 wherein the interface portion comprises a receiver for mounting to the articulated arm assembly, the receiver having a first end and a second end; and
  a third pivot component mounted on the receiver and being pivotally mounted to the outboard link portion.

3. A valve tester assembly comprising:
  an articulated arm assembly having a first end and a second end, the second end of the articulated arm assembly being movable away from and toward the first end such that when the first end of the articulated arm assembly is connected to a vehicle, the second end of the articulated arm assembly is moveable away from and toward the vehicle;
  a rotation means mounted on the articulated arm assembly toward the second end of the articulated arm assembly for a shaft for exercising a valve; and
  moving means mountable on a vehicle for moving the first end of the articulated arm assembly away from and towards the vehicle; and
  wherein the extended reach link assembly includes:
    a mounting portion for mounting on the support;
    an inboard link portion pivotally mounted to the mounting portion;
    an outboard link portion pivotally mounted to the inboard link portion;
  an interface portion for mounting to the first portion of the articulated arm assembly, the interface portion being pivotally mounted to the outboard link portion;
  wherein the mounting portion comprises a mounting bar having a first end insertable into the hitch receiver and having a second end and a first pivot component mounted on the second end of the mounting bar;
  wherein the inboard link comprises a first sleeve for receiving a pivot post of the mounting portion;
  wherein the outboard link portion comprises a second sleeve receiving a second pivot post of the inboard link portion in a pivotal manner, at least one outboard link member being mounted on the second sleeve, and a third sleeve mounted on the at least one outboard link member opposite of the second sleeve;
  wherein the interface portion comprises a receiver for mounting to the articulated arm assembly, the receiver having a first end and a second end, and a third pivot component mounted on the receiver and being pivotally mounted to the outboard link portion;
  a first position locking assembly configured to lock a pivot position of the inboard link portion of the extended reach link assembly with respect to the mounting portion of the extended reach link assembly;
  a second position locking assembly configured to lock a pivot position of the outboard link portion of the extended reach link assembly with respect to the inboard link portion of the extended reach link assembly; and
  a third position locking assembly configured to lock a pivot position of the interface portion of the extended reach link assembly with respect to the outboard link portion of the extended reach link assembly.

4. A valve tester assembly comprising:
  an articulated arm assembly having a first end and a second end, the second end of the articulated arm assembly being movable away from and toward the first end such that when the first end of the articulated arm assembly is connected to a vehicle, the second end of the articulated arm assembly is moveable away from and toward the vehicle:
  a rotation means mounted on the articulated arm assembly toward the second end of the articulated arm assembly for a shaft for exercising a valve; and
  moving means mountable on a vehicle for moving the first end of the articulated arm assembly away from and towards the vehicle;

wherein the articulated arm assembly is pivotable with respect to the extended reach link assembly about a substantially vertical axis and wherein the arm assembly includes:

a first arm portion;

a second arm portion pivotally and rotatable coupled to the first arm portion, and a third arm portion pivotally coupled to the second arm portion;

wherein the arm assembly further includes:

a first biasing assembly coupled to the first arm portion and the second arm portion and effective to bias pivot movement of the second arm portion with respect to the first arm portion; and a second biasing assembly coupled to the third arm portion and the rotating assembly and effective to bias pivot movement of the rotating assembly with respect to the third arm portion.

5. The valve tester assembly of claim 4 wherein the first biasing assembly comprises at least one spring member; and wherein the second biasing assembly comprises at least one spring member.

6. A valve tester system comprising:

a support;

an extension assembly having at least two elongated extension links having a long horizontal axis and a short horizontal axis, each link pivotally coupled to a next elongated link towards an end substantially along the long horizontal axis of the link, the at least two extension links including an inboard link having a proximal and distal end and an at least second link having a second proximal end and second distal end, the proximal end of the inboard link coupled to the support, the inboard link pivotally coupled with respect to the at least second link, the pivotal coupling of each link permitting pivoting on a vertical axis;

an articulated arm assembly having a first elongated arm and a second elongated arm, the assembly having at least one pivot point about at least one horizontal axis, the first and second arms having a proximal and distal ends, the proximal end of the second arm coupled to the distal end of the first arm, the first elongated arm coupled to the distal end of the at least second link, the first elongated arm capable of pivoting around a vertical axis with respect to the at least second link; and a valve tester assembly coupled to the articulated arm assembly at the distal end of the second elongated arm, the valve tester assembly including a motor, motor control, a rotating connection for rotation by the motor, the connection being configured to connect to a valve to move the valve between and open and closed position, the motor control effective for controlling the rotation of the motor and the valve, and the extension links moving in a generally horizontal plane and pivoting relative to each other to move the valve tester assembly toward and away from the support.

7. The valve tester system of claim 6 wherein the valve tester assembly pivots on a horizontal axis, and the first arm and the at least second arm pivot relative to each other on a horizontal axis.

8. The valve tester system of claim 6 wherein there is a pivot point between the at least second link and the articulated arm assembly which permits pivoting of the articulated arm assembly around a horizontal axis.

9. The valve tester system of claim 7 wherein there is a pivot point between the at least second link and the articulated arm assembly which permits pivoting of the articulated arm assembly around a horizontal axis.

10. The valve tester system of claim 8, wherein a first resilient biasing assembly is between the at least second link and the first elongated arm and a second resilient biasing assembly is between the first and second arms.

11. The valve tester system of claim 6 wherein there are two pivot points around a vertical axis between the inboard link and the at least second link.

12. A valve tester system comprising:

a support;

an extension assembly having at least two elongated extension links having a long horizontal axis and a short horizontal axis, each link pivotally coupled to a next elongated link towards an end substantially along the long horizontal axis of the link, the at least two extension links including an inboard link having a proximal and distal end and an at least second link having a second proximal end and second distal end, the proximal end of the inboard link coupled to the support, the inboard link pivotally coupled with respect to the at least second link, the pivotal coupling of each link permitting pivoting on a vertical axis;

an articulated arm assembly having a first elongated arm and a second elongated arm, the first and second arms having a proximal and distal ends, the proximal end of the second arm coupled to the distal end of the first arm, the first elongated arm coupled to the distal end of the at least second link, the first elongated arm pivotal around a vertical axis with respect to the at least second link; and a valve tester assembly coupled to the articulated arm assembly at the distal end of the second elongated arm, the valve tester assembly including a motor, motor control, a rotating connection for rotation by the motor, the connection being configured to connect to a valve to move the valve between and open and closed position, the motor control effective for controlling the rotation of the motor and the valve, and the extension links moving in a generally horizontal plane and pivoting relative to each other to move the valve tester assembly toward and away from the support.

13. The valve tester system of claim 12, wherein there are two pivot points around a vertical axis between the inboard link and the at least second link.

14. The valve tester system of claim 13 wherein the valve tester assembly pivots on a horizontal axis, and the first arm and the at least second arm pivot relative to each other on a horizontal axis.

15. The valve tester system of claim 14 wherein there is a pivot point between the at least second link and the articulated arm assembly which permits pivoting of the articulated arm assembly around a horizontal axis.

* * * * *